United States Patent [19]

Holmstrom et al.

[11] Patent Number: 4,570,313

[45] Date of Patent: Feb. 18, 1986

[54] SPINDLE LOCK-UP DEVICE

[75] Inventors: Paul E. Holmstrom; Joseph F. Ogrinc, both of Cincinnati, Ohio

[73] Assignee: G. A. Gray Division, The Warner & Swasey Company, Cincinnati, Ohio

[21] Appl. No.: 687,850

[22] Filed: Dec. 31, 1984

[51] Int. Cl.[4] .................................. B23C 5/26
[52] U.S. Cl. ...................... 29/26 A; 29/1 A; 29/27 C; 408/20; 409/144; 409/231; 409/241
[58] Field of Search ............ 29/26 A, 27 C, 1 A, 29/568; 409/206, 207, 209, 241, 231, 232, 233, 234, 144; 408/239 R, 239 A, 20

[56] References Cited

U.S. PATENT DOCUMENTS

| | | | |
|---|---|---|---|
| 3,477,121 | 11/1969 | Martin | 29/568 |
| 3,807,011 | 4/1974 | Harman et al. | 29/568 |
| 3,851,364 | 12/1974 | Noa et al. | 29/26 A |
| 4,480,366 | 11/1984 | Takahashi et al. | 29/26 A |

Primary Examiner—Z. R. Bilinsky
Attorney, Agent, or Firm—Frost & Jacobs

[57] ABSTRACT

A spindle lock-up device for detachably locking a rotary spindle having a tool holder at its end to a non-rotatable support, such as the ram of a vertical boring machine, so that the spindle tool holder also may be used as a fixed tool holder for the ram, the device having a first spiroid gear member fixed to the ram, a second spiroid gear member surrounded by the first gear member and fixed to the spindle, and a third spiroid gear member surrounding said spindle and mounted for axial movement from a retracted to an extended position, the third gear member simultaneously engaging the first and second gear members when in the extended position to lock the spindle against rotation relative to the ram, the third gear member being moved to the extended position by a displaceable piston.

12 Claims, 3 Drawing Figures

SPINDLE LOCK-UP DEVICE

This invention relates to machine tools and has to do more particularly with vertical machining systems for performing a variety of machining operations.

BACKGROUND OF THE INVENTION

It has hitherto been proposed to utilize a rotatable spindle in conjunction with the ram of a vertical boring mill, the spindle being rotatably journaled within the ram so that the device may be used both for boring and drilling operations. Such arrangements have heretofore required separate tool holders depending upon whether the tool is to be mounted on the ram or on the spindle. Since the ram surrounds the spindle, it was necessary for the tool holders to be of different sizes and the tool holder for the ram could not be used to mount tools on the spindle, or vise versa.

It has been suggested that a single tool holder could be utilized provided the spindle is immobilized during a turning operation. However, where this is done, the resultant reaction forces encountered during a boring operation are transmitted to the ram through the spindle bearings with the result that the bearings quickly lose their precision resulting in rapid burnout.

In contrast to the foregoing, the present invention provides a spindle lock-up device which enables the spindle to function as a fixed tool support without transmitting the resultant reaction forces through the precision bearings which support the spindle.

SUMMARY OF THE INVENTION

In accordance with the invention, the lock-up device is mounted on the distal end of the spindle, the spindle having a tapered socket for receiving a tool which is secured in the socket by means of a key-engaging tool holder mounted on the spindle adjacent the socket. The lock-up device, which is contained within a housing surrounding the free end of the spindle, comprises a set of three spiroid gear members which interact to lock the spindle to the ram. A first of the spiroid gear members is fixedly secured to the ram and a second of the gear members is fixedly secured to the spindle, the first and second gear members having their teeth arranged to be jointly engaged by the third spiroidal gear member slidably mounted for movement relative to the spindle which effectively interconnects and locks the first and second gear members against relative movement.

The third gear member is displaceable toward the first and second gear members under the influence of a fluid piston which, when actuated, displaces the third gear member into engagement with the first and second gear members, thereby fixedly securing the spindle to the ram. When the fluid pressure on the piston is released, return springs displace the third gear member so as to release it from engagement with the first and second gear members, thereby releasing the spindle for normal rotation.

The arrangement of the gear members relative to each other is such that the reaction forces are transmitted to the ram through the gear members, thereby by-passing the bearings which support the spindle and hence avoiding damage to the bearings.

DESCRIPTION OF THE PREFERRED EMBODIMENT

Figure 1:
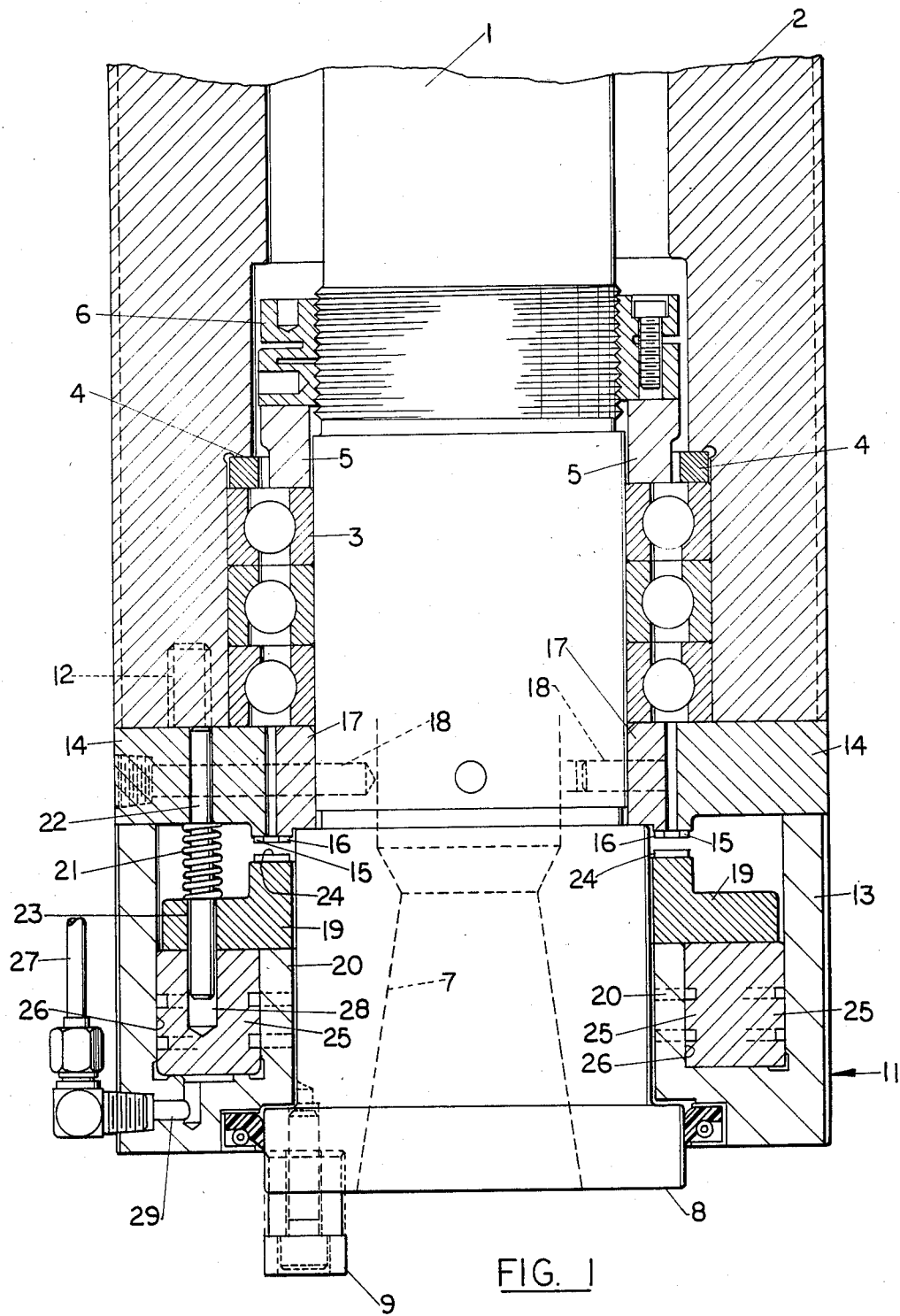
FIG. 1 is a fragmentary vertical sectional view showing the lower end of the ram and spindle with the lock-up device mounted thereon, the lock-up device being in the disengaged position.
Figure 2:
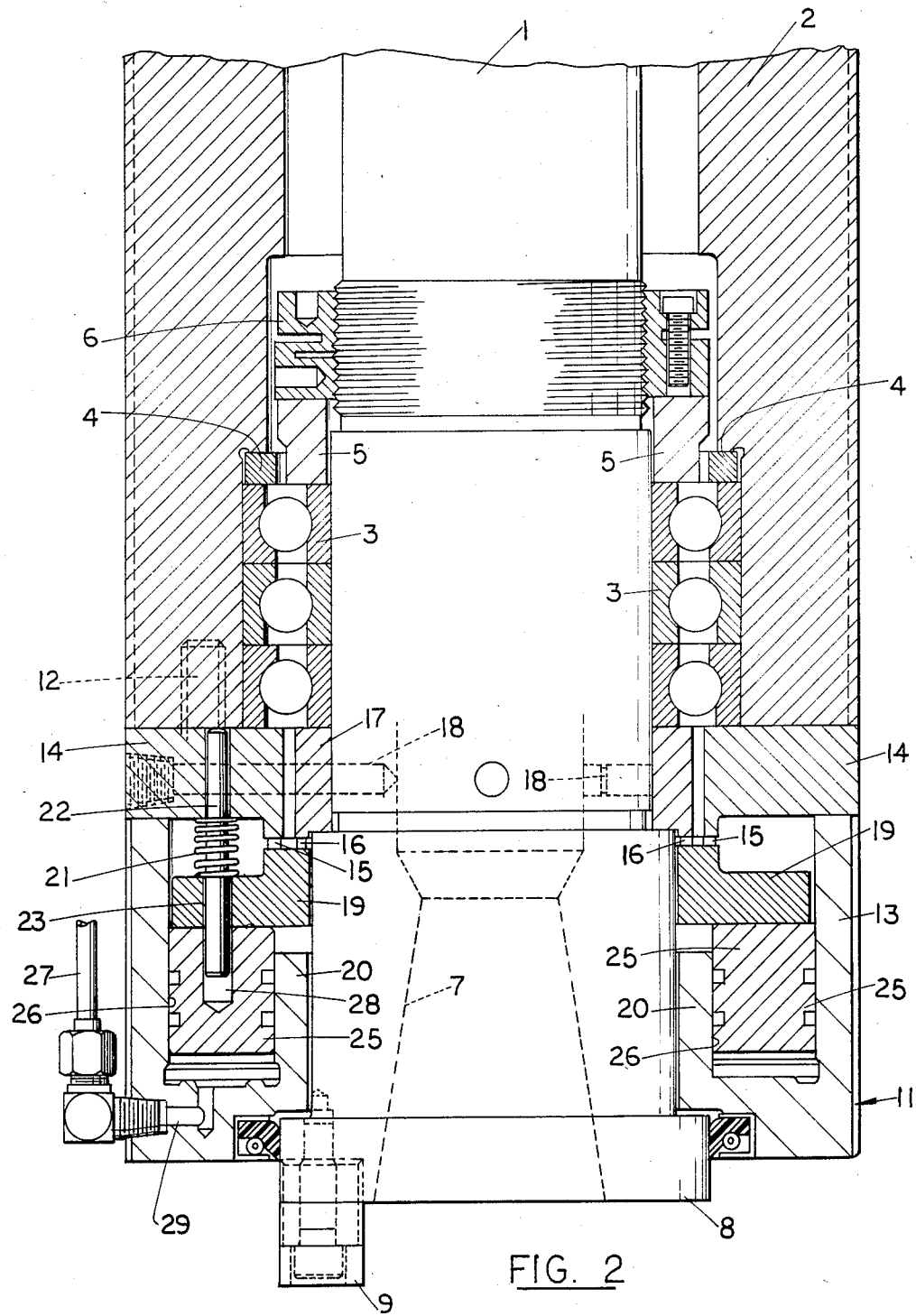
FIG. 2 is a vertical sectional view similar to FIG. 1 but with the parts in the locked position.

Referring first to FIGS. 1 and 2, a spindle 1 is rotatably journaled within the ram 2 by means of bearings 3 which are held in place by spacers 4 and 5 and adjustable lock nut 6. It will be understood that additional bearing assemblies will be provided axially along the spindle 1 and that the spindle will be rotated by conventional mechanism which forms no part of the present invention. Similarly, the ram 2, together with the spindle, will be displaceable axially as well as transversely by conventional means forming no part of the present invention.

Figure 3:
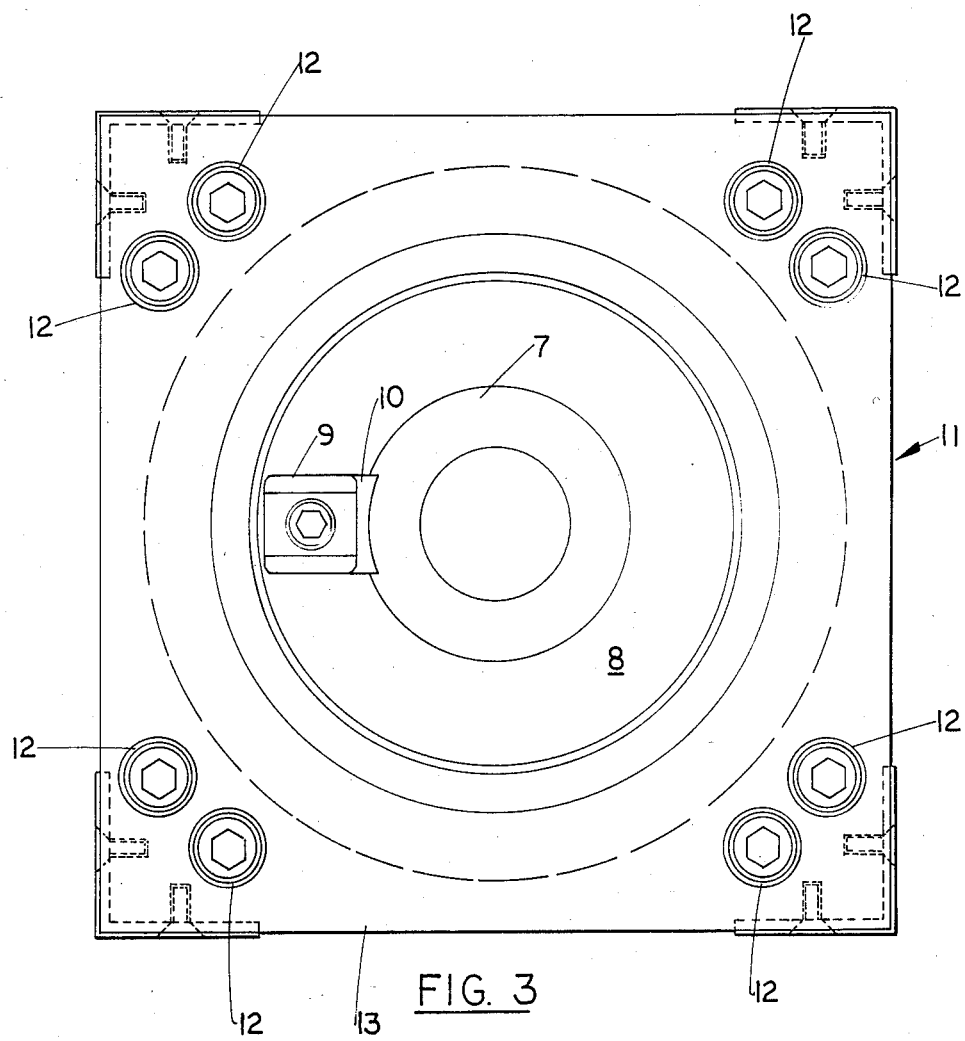
FIG. 3 is a bottom plan view of the device shown in FIGS. 1 and 2.

At its lowermost end the spindle is provided with a tapered socket 7 surrounded by an annular flange 8 which mounts a tool holder 9 having a tool engaging key 10, shown in FIG. 3.

The lock-up device, indicated generally at 11, is secured to the end of the ram 2 by means of screws 12 which extend through the lock-up device adjacent its corners, the screws extending through a housing 13 which, at its inner end, abuts against a first annular spiroid gear member 14 seated on and fixedly secured to the distal end of the ram 2 by means of the screws 12. The first gear member 14 has teeth 15 lying radially outwardly with respect to the teeth 16 of a second annular spiroid gear member 17 which surrounds and is fixedly secured to the spindle 1 by pins 18. The second gear member (17) is normally free to rotate with the spindle.

A third spiroid gear member 19 is slidably mounted within the housing 13, the third gear member seating on an annular wall 20 forming a part of the housing 13, the annular wall establishing the retracted position of the third gear member. The third gear member is urged to the retracted position by a series of springs 21, preferably six in number, extending between the first and third gear members, the springs surrounding guide pins 22 press fitted in first gear member 14, the guide pins extending downwardly through clearance bores 23 in the third gear member 19, the guide pins being loosely received in the bores. The third gear member is thus fixed against rotation relative to the spindle 2 and the first and second gear members.

The third gear member 19 is provided with a set of teeth 24 which face the teeth 15 and 16 of the first and second gear members 14 and 17, respectively, the teeth 24 concurrently meshing with the teeth 15 and 16 when the third gear member 19 is displaced axially against the compression of springs 21. To this end, the guide pins 21 are loosely received in the bores 23 of the third gear member so that the teeth 24 may readily accommodate to the sets of teeth 15 and 16 as the gears are engaged.

The third gear member 19 is axially displaced by means of a piston 25 mounted in annular chamber 26 in housing member 13, the piston being biased to its retracted position by means of the springs 21 which urge the third gear member 19 into contact with the upper surface of piston 25, the piston lying in its fully retracted position when the third gear member 19 is seated on annular wall 20. Fluid under pressure is supplied to the undersurface of piston 25 through conduit 27 which will be connected to a source of fluid under pressure including suitable valve means for introducing fluid under pressure into chamber 26 and for venting the chamber. The guide pins 22 also serve as guides for the piston 25 which is provided with bores 28 which are of a size to permit the piston to freely move from its retracted position to its fully extended position.

In the operation of the device, the parts normally assume the position illustrated in FIG. 1, which is the free running mode in which the spindle 1 is free to rotate relative to the ram 2. The third gear member 19 is limited to only minor rotation relative to the fixed gear member 14. With typical spindle orientation systems, the spindle can always be positioned with sufficient accuracy to engage the correct tooth location, and subsequent gear engagement forces the spindle into exact location, as determined by the fixed gear 14. Upon stoppage of spindle rotation, approximately in the desired position, fluid under pressure is introduced into chamber 26 through conduit 27, thereby displacing the piston 25 in the direction of the third gear member 19 and causing the upper surface of piston 25 to displace the third gear member 19 against the compression of springs 21. Such movement also causes the teeth 24 of the third gear member to simultaneously engage the teeth 15 and 16 of gear members 14 and 17, respectively, thereby rigidly fixing the spindle 1 to ram 2 through the locked gear members 14, 17 and 19, the parts thus assuming the position illustrated in FIG. 2. With this arrangement, the reaction forces acting on the spindle 1 when serving as a stationary tool holder are transmitted from the spindle 1 directly to the ram 2 through the interconnected gear members rather than through the spindle bearings 3, thereby avoiding damage to the bearings.

When it is desired to release the spindle for rotation, the fluid pressure in chamber 26 is relieved, which releases the piston 25 for return movement to its retracted position under the influence of springs 21 acting through third gear member 19 which returns to its retracted position, thereby disengaging gear members 14 and 17, the gear member 17 being freed for rotation with the spindle, the parts thus reassuming the position illustrated in FIG. 1.

As should now be apparent, the invention provides a simple and efficient lock-up device by means of which the rotatable spindle becomes a stationary tool holder rigidly fixed within the ram. The device permits rapid conversion between the spindle mode and the vertical boring machine mode by simple actuation of the piston 25 which may be controlled hydraulically, pneumatically or electrically. The invention eliminates the necessity for providing two sets of keys to mount the tools and hence permit standardization in that all tools are mounted in a single holder irrespective of whether a turning, boring, or drilling operation is being performed. While a preference is expressed for spiroid gears, it will be evident that other forms of gear members could be employed, the essential consideration being the interlocking of the gear members to effectively lock the spindle against rotation. Other modifications may be made without departing from the spirit and purpose of the invention. For example, the third gear member could be keyed to the spindle for rotation therewith rather than fixed relative to the first gear member, and the third gear member could be milled to provide separate sets of teeth for engagement with the teeth of the first and second gear members, respectively.

What is claimed is:

1. A lock-up device for detachably connecting a rotatable spindle having a tool holder at its free end to a surrounding non-rotatable support so that the spindle may serve as a fixed tool support, said device comprising a first gear member fixedly secured to said non-rotatable support, a second gear member fixedly secured to said spindle for rotation therewith, a third gear member movable axially relative to said spindle from a retracted to an extended position, said first and second gear members each having teeth facing said third gear members, said third gear member having teeth facing said first and second gear members positioned to engage the teeth of said first and second gear members when said third gear member is moved axially from its retracted to its extended position, means normally maintaining said third gear member in its retracted position, and actuating means for moving said third gear member to its extended position, whereby said spindle is locked against rotation relative to said non-rotatable support by the concurrent engagement of the teeth of said third gear member with the teeth of said first and second gear members.

2. The lock-up device claimed in claim 1 wherein each of said gear members comprises a spiroid gear.

3. The lock-up device claimed in claim 1 wherein said actuating means comprises piston means movable from a retracted to an extended position, said piston means being positioned to contact said third gear member to move said third gear member from its retracted to its extended position upon displacement of said piston means.

4. The lock-up device claimed in claim 3 wherein said first, second and third gear members comprise annular gear members surrounding said spindle, said first and second gear members being concentric with respect to each other.

5. The lock-up device claimed in claim 4 wherein said piston means comprises an annular piston, surrounding said spindle.

6. The lock-up device claimed in claim 5 including stop means positioned to establish the retracted position of said third gear member.

7. The lock-up device claimed in claim 6 wherein the means normally maintaining said third gear member in the retracted position comprises spring means.

8. The lock-up device claimed in claim 7 wherein said third gear member is positioned to urge said piston to its retracted position under the influence of said spring means.

9. A lock-up device for detachably connecting a rotatable spindle having a tool holder at its free end to the ram of a vertical boring machine to provide a fixed tool holder for said ram, said spindle being rotatably journaled in said ram by sets of bearings, said lock-up device comprising a housing fixedly secured to the distal end of said ram and surrounding the free end of said spindle, a first annular spiroid gear member surrounding said spindle and fixedly secured to said ram, a second annular spiroid gear member surrounded by said first gear member and fixedly secured to said spindle, a third spiroid gear member surrounding said spindle adjacent said first and second gear members, guide means slidably connecting said third gear member for axial movement relative to said first and second gear members, said first and second gear members each having teeth facing said third gear member said third gear member having teeth facing said first and second gear members positioned to simultaneously interlock with the teeth of said first and second gear members when said third gear member is moved axially relative to said spindle from a retracted to an extended position, spring means normally biasing said third gear member to its retracted position, an annular chamber in said housing facing said third gear member, an annular piston in said chamber movable from a retracted position to an extended position in which said piston moves said third gear member to its extended position, and conduit means for introducing fluid under pressure into said chamber to move said piston to its extended position, whereby to displace said third gear member into engagement with said first and second gear members to lock said spindle against rotation relative to said ram, said third gear member and said piston returning to their retracted positions under the influence of said sping means upon the venting of fluid from said chamber, thereby freeing said spindle for rotation relative to said ram.

10. The lock-up device claimed in claim 9 wherein said guide means comprises a plurality of spaced apart guide pins projecting downwardly from said first gear member and slidably received in said third gear member and said piston.

11. The lock-up device claimed in claim 10 wherein the spring means normally biasing said third gear member to its retracted position comprises a plurality of spaced apart helical springs surrounding said guide pins and extending between said first and third gear members.

12. The lock-up device claimed in claim 11 including stop means positioned to establish the retracted position of said third gear member.

* * * * *